United States Patent [19]

Novotny

[11] Patent Number: 4,600,558

[45] Date of Patent: Jul. 15, 1986

[54] METHOD AND COMPOSITION FOR CORROSION INHIBITION OF CARBON STEEL BY AMMONIUM SULFATE

[75] Inventor: Joseph Novotny, Baton Rouge, La.

[73] Assignee: Allied Corporation, Morris Township, Morris County, N.J.

[21] Appl. No.: 671,722

[22] Filed: Nov. 15, 1984

Related U.S. Application Data

[62] Division of Ser. No. 164,486, Jun. 30, 1980.

[51] Int. Cl.$^4$ ................................................. C23F 11/00
[52] U.S. Cl. .......................................... 422/7; 71/63; 71/64.10; 71/34
[58] Field of Search ............... 252/387; 71/1, 34, 54, 71/61, 63, 64.10; 423/268, 545; 422/7, 25

[56] References Cited

U.S. PATENT DOCUMENTS

| | | | |
|---|---|---|---|
| 3,309,324 | 3/1967 | Langguth et al. | 71/63 X |
| 3,493,337 | 2/1970 | Every et al. | 71/61 X |
| 3,930,832 | 1/1976 | Sansing, Jr. et al. | 71/64.1 X |

OTHER PUBLICATIONS

Betz Handbook, 6th Ed., 1962, pp. 254-269 & 271-278.

*Primary Examiner*—Ferris H. Lander
*Attorney, Agent, or Firm*—Richard C. Stewart, II; Gerhard H. Fuchs

[57] ABSTRACT

Corrosion of carbon steel storage and mixing equipment is inhibited by admixing an effective amount of a member selected from the group consisting of ammonium polyphosphate, sodium nitrite, potassium nitrite, ammonium thiosulfate, sodium thiosulfate and potassium thiosulfate with an aqueous solution of ammonium sulfate useful as a fertilizer.

6 Claims, No Drawings

METHOD AND COMPOSITION FOR CORROSION INHIBITION OF CARBON STEEL BY AMMONIUM SULFATE

This application is a division of application Ser. No. 164,486, filed June 30, 1980.

BACKGROUND OF THE INVENTION

This invention relates to a method and composition for inhibition of corrosion of carbon steel storage and mixing tanks containing aqueous solutions of ammonium sulfate by addition thereto of small amounts of ammonium polyphosphate, sodium nitrite, potassium nitrite, ammonium thiosulfate, sodium thiosulfate or potassium thiosulfate. Ammonium sulfate, in the form of aqueous solution is useful as a fertilizer. The equipment employed in mixing and storing these aqueous fertilizer solutions is commonly constructed of carbon steel. However, aqueous ammonium sulfate solutions are acidic and as such, corrosive to equipment made of carbon steel. If such corrosion proceeds unchecked, damage to equipment, contamination and loss of aqueous ammonium sulfate solution can become substantial, especially at periods of peak fertilizer demand.

U.S. Pat. No. 3,930,832 discloses that corrosion of carbon steel by an aqueous solution of zinc nitrate, ammonium nitrate and urea is inhibited by incorporating therein an effective amount of ammonium thiosulfate.

U.S. Pat. No. 4,191,550 discloses that incorporation of a water-soluble thiosulfate into storage-stable liquid compositions of magnaesium nitrate, ammonium nitrate and urea satisfactorily provides protection for carbon steel equipment without deleterious effect on the stability or salt-out temperature of the composition.

Accordingly it is one object of this invention to provide a simple method and composition for corrosion inhibition of carbon steel equipment in contact with a aqueous ammonium sulfate solution.

SUMMARY OF THE INVENTION

In accordance with the present invention there is provided an aqueous ammonium sulfate fertilizer solution, the improvement which comprises an effective amount of a carbon steel corrosion inhibitor selected from the group consisting of ammonium polyphosphate, ammonium thiosulfate, sodium thiosulfate, potassium thiosulfate, potassium nitrite and sodium nitrite.

The present invention also provides a fertilizer composition comprising ammonium sulfate and an effective amount of a carbon steel corrosion inhibitor selected from the group consisting of ammonium polyphosphate, ammonium thiosulfate, sodium thiosulfate, potassium thiosulfate, potassium nitrite and sodium nitrite.

There is further provided by the present invention a process for inhibiting carbon steel corrosion by an aqueous ammonium sulfate fertilizer solution comprising adding to said solution a member selected from the group consisting of ammonium polyphosphate, sodium nitrite, potassium nitrite, ammonium thiosulfate, sodium thiosulfate and potassium thiosulfate in an amount effective to substantially inhibit corrosion of carbon steel in contact with said solution.

DETAILED DESCRIPTION

The present invention provides a method, solution and composition for inhibiting corrosion of carbon steel storage and mixing equipment for holding aqueous ammonium sulfate fertilizer solution by admixing an effective amount, usually at least about 0.1% by weight of of a member selected from the group consisting of ammonium polyphosphate, ammonium thiosulfate, sodium thiosulfate, potassium thiosulfate, potassium nitrite and sodium nitrite. An upper limit on the effective amount of a carbon steel corrosion inhibitor has not been found to be critical; an amount of one of the carbon steel corrosion inhibitors of the present invention in excess of at least about 0.1% by weight has been found to be effective. Only economic consideration would preclude employing an effective amount of one of these corrosion inhibitors in excess of 5% by weight. By operating in accordance with the present invention, corrosion of carbon steel equipment used in mixing and storing aqueous ammonium sulfate solution is substantially inhibited when the ammonium sulfate fertilizer composition comprises at least about 0.1% by weight of a member selected from the group consisting of ammonium polyphosphate, ammonium thiosulfate, sodium thiosulfate, potassium thiosulfate, sodium nitrite and potassium nitrite. In preferred embodiments of the present invention the inhibitor of carbon steel corrosion by aqueous ammonium sulfate solution exceeded 90%, compared to uninhibited solutions, when the ammonium sulfate fertilizer composition comprised 0.5% by weight of ammonium polyphosphate or 0.5% by weight of sodium nitrite. In another preferred embodiment, the inhibition of corrosion of the carbon steel is essentially 100% when the aqueous ammonium sulfate solution comprised 0.6% by weight ammonium thiosulfate. While the effective amount of one of the corrosion inhibitors disclosed herein can exceed at least about 0.1% by weight, it is one of the features of the present invention that only a relatively small amount, i.e., usually from at least about 0.1 to about 5% by weight of one of the corrosion inhibitors recited above is necessary for almost complete inhibition of carbon steel corrosion by aqueous ammonium sulfate solutions.

The ammonium sulfate fertilizer compositions of the present invention are prepared by admixing an effective amount, usually from at least about 0.1 to about 5.0% by weight of a carbon steel corrosion inhibitor selected from the group consisting of ammonium polyphosphate, ammonium thiosulfate, sodium thiosulfate, potassium thiosulfate, potassium nitrite and sodium nitrite in a minimum amount of water with an aqueous ammonium sulfate solution. While the inhibition of corrosion of the carbon steel equipment is maximized when an effective amount of a corrosion inhibitor preferably in the form of an aqueous solution, is added concurrent with the dissolution of the ammonium sulfate, in accordance with the present invention, further corrosion of carbon steel already in contact with an aqueous solution of ammonium sulfate is also effectively retarded by addition to the standing solution of an effective amount, usually about at least about 0.1 to about 5.0% by weight of a carbon steel corrosion inhibitor selected from the group consisting of ammonium polyphosphate, ammonium thiosulfate, sodium thiosulfate, potassium thiosulfate, potassium nitrite and sodium nitrite.

While the prior art teaches that special precautions, i.e. equipment constructed of special alloys or equipped with glass liners were necessary to inhibit the corrosion of carbon steel by ammonium sulfate fertilizer solutions, the present invention provides a simple, inexpensive fertilizer composition solution, and method for inhibiting corrosion of carbon steels, for example, 7-283 and 7-285 steels, which steels are commonly used for equipment to mix, process and store ammonium sulfate fertilizer solutions.

Ammonium sulfate, an article of commerce, is produced as a by-product in the manufacture of caprolactam as well as by direct synthesis. Solid ammonium sulfate is highly soluble in water; aqueous solution containing up to about 41.4% by weight ammonium sulfate can be prepared at 0° C. Aqueous solutions of ammonium sulfate, useful as a fertilizer, vary in composition from 30 to 44% by weight, typically 38–42% by weight ammonium sulfate. It is to be understood, however, that the concentration of ammonium sulfate is not critical to the effectiveness of the corrosion inhibitors of the present invention.

Whereas in the past handling and storage of uninhibited ammonium sulfate solution, at the height of the growing season, resulted in severe corrosion of carbon steel equipment which corrosion both consumed and contaminated the fertilizer solutions, the present invention provides a method, an aqueous ammonium sulfate fertilizer solution and composition which almost completely eliminates the corrosion of carbon steel storage tanks, mixing equipment and tank trucks used in preparing, shipping and applying aqueous ammonium sulfate fertilizer solutions.

While aqueous ammonium sulfate fertilizer solution comprising an effective amount of a carbon steel corrosion inhibitor have been discussed, the present invention also contemplates a fertilizer composition comprising ammonium sulfate and an effective amount of a carbon steel corrosion inhibitor selected from the group consisting of ammonium polyphosphate, ammonium thiosulfate, sodium thiosulfate, potassium thiosulfate, potassium nitrite and sodium nitrite. The amount of a carbon steel corrosion inhibitor of the present invention found effective in accordance with the present invention is at least about 0.1% by weight of the composition. The fertilizer compositions of the present invention can be prepared by any convenient means, for example by directly admixing an effective amount one of the carbon steel corrosion inhibitors of the present invention, in solid form with solid ammonium sulfate or alternatively by adding an effective amount of a corrosion inhibitor to a step or solution in the preparation or purification of ammonium sulfate.

Table I, below, summarizes corrosion inhibition of coupons of carbon steel 7-285 immersed in 38% by weight aqueous soluions of ammonium sulfate at room temperature (25° C.) for 10–20 days when an effective amount of ammonium polyphosphate, sodium nitrite or ammonium thiosulfate was admixed during the dissolution of the ammonium sulfate. The rate of corrosion of a coupon of carbon steel 7-285, immersed in a 38% by weight aqueous ammonium sulfate solution without one of the corrosion inhibitors of the present invention was 17.0 mils per year. When one of the preferred carbon steel corrosion inhibitors of the present invention was admixed during dissolution of the ammonium sulfate, the percent of inhibition of carbon steel corrosion ranged from more than 90% up to 98%, compared to carbon steel in contact with uninhibited ammonium sulfate.

TABLE I

CORROSION INHIBITION OF CARBON STEEL[1] CONTAINING 38% BY WEIGHT OF AMMONIUM SULFATE IN WATER

| Run | Inhibitor[2] (% by weight) | Rate of Corrosion[3] (mils/yr) | Percent Corrosion Inhibition[5] |
|---|---|---|---|
| 1 | None | 17.0 | — |
| 2 | 0.5% ammonium polyphosphate | 1.6[4] | 90.6 |
| 3 | 0.5% sodium nitrite | 1.0 | 94.1 |
| 4 | 0.6% ammonium thiosulfate | 0.35 | 98 |

[1]Carbon steel 7-285
[2]Admixed during dissolution of ammonium sulfate
[3]After 10 days at room temperature = 25° C.
[4]After 20 days at room temperature = 25° C.
[5]Compared to uninhibited ammonium sulfate solutions While the results of carbon steel corrosion inhibition summarized in Table I illustrates preferred embodiments of the present invention wherein aqueous solutions of preferred corrosion inhibitors are admixed with the ammonium sulfate solution during dissolution, addition of an effective amount, usually from about 0.1 to about 5.0% by weight of the corrosion inhibitors selected from the group consisting of ammonium polyphosphate, ammonium thiosulfate, sodium thiosulfate, potassium thiosulfate, sodium nitrite and potassium nitrite to previously prepared ammonium sulfate fertilizer solutions is also contemplated within the scope of the present invention.

EXPERIMENTAL

Example 1

A coupon of carbon steel 7-285, having a total surface area of 36.315 square centimeters and weighing 69.6972 grams was immersed in a 38% by weight aqueous solution of ammonium sulfate (8-0-0-9(S) grade fertilizer) for a period of 10 days. The weight loss by the coupon was 0.3346 grams; this is equivalent to a corrosion rate of 17.0 mils per year for carbon steel 7-285.

Example 2

A coupon of carbon steel 7-285, having a total surface area of 37.069 square centimeters and weighing 73.2348 grams was immersed in a 38% by weight aqueous solution of ammonium sulfate (8-0-0-9(s) grade fertilizer) inhibited with 0.5 percent by weight sodium nitrite ($NaNO_2$) for a period of ten days. The weight loss by the coupon was 0.0225 grams; this is equivalent to a corrosion rate of one mil per year.

Example 3

A coupon of carbon steel 7-285, having a total surface area of 36.309 square centimeters and weighing 71.3065 grams was immersed in a 38 percent solution of ammonium sulfate (fertilizer grade: 8-0-0-9S) inhibited with 0.6 percent by weight ammonium thiosulfate and held at room temperature for ten days. The measured weight loss was 0.0069 grams, which is equivalent to a corrosion rate of 0.35 mils per year.

Example 4

A coupon of carbon steel 7-285 having a total surface area of 36.26 square centimeters and weighing 62.2165 grams was immersed in a 38 percent solution of ammonium sulfate (fertilizer grade: 8-0-0-9S) inhibited with 0.5 weight percent (equivalent to about 0.17 weight percent $P_2O_5$) ammonium polyphosphate solution (Poly-N 10-34-0 fertilizer grade: 60 percent of the phosphate as polyphosphate) and held at room temperature for twenty-eight days with mild agitation. The measured weight loss was 0.0913 grams, which is equivalent to a corrosion rate of 1.6 mils per year.

Example 5

A coupon of carbon steel 7-285 is immersed in a 38 weight % aqueous solution of ammonium sulfate containing 0.1 weight % potassium nitrite at 25° C. for a period of 20 days. The inhibition of carbon steel corrosion is similar to that in Example 2.

Example 6

A coupon of carbon steel 7-285 is immersed in a 38% by weight aqueous solution of ammonium sulfate containing 0.1% by weight sodium thiosulfate at 25° C. for 20 days. The inhibition of corrosion of the carbon steel is similar to that of Example 3.

Example 7

A coupon of carbon steel 7-285 is immersed in a 38% by weight aqueous solution of ammonium sulfate containing 0.1% by weight potassium thiosulfate at 25° C. for a period of 20 days. The inhibition of corrosion of carbon steel is similar to that recited in Example 4.

Example 8

A coupon of carbon steel 7-283 is immersed in a 38% by weight aqueous solution of ammonium sulfate containing 0.1% by weight of ammonium thiosulfate at 25° C. for 20 days. The inhibition of corrosion for the 7-283 carbon steel is similar to that recited in Example 4.

What is claimed is:

1. A process for inhibiting carbon steel corrosion by an aqueous ammonium sulfate fertilizer solution in contact with carbon steel comprising adding to said solution a member selected from the group consisting of ammonium polyphosphate, sodium nitrite, potassium nitrite, ammonium thiosulfate, sodium thiosulfate and potassium thiosulfate in an amount effective to substantially inhibit corrosion of said carbon steel in contact with said solution.

2. The process as described in claim 1 wherein the effective amount of corrosion inhibitor is at least about 0.1% by weight.

3. The process as described in claim 1 wherein from about 0.1% to about 5.0% by weight of ammonium thiosulfate is added.

4. The process as described in claim 1 wherein from about 0.1% to about 5.0% by weight of sodium thiosulfate is added.

5. The process as described in claim 1 wherein from about 0.1% to about 5.0% by weight potassium thiosulfate is added.

6. The process as described in claim 1 which further comprises adding a solution of the corrosion inhibitor to the ammonium sulfate solution.

* * * * *